March 1, 1932.    B. C. ROCKWELL    1,847,983
EQUALIZING ATTACHMENT
Filed April 30, 1931    3 Sheets-Sheet 1
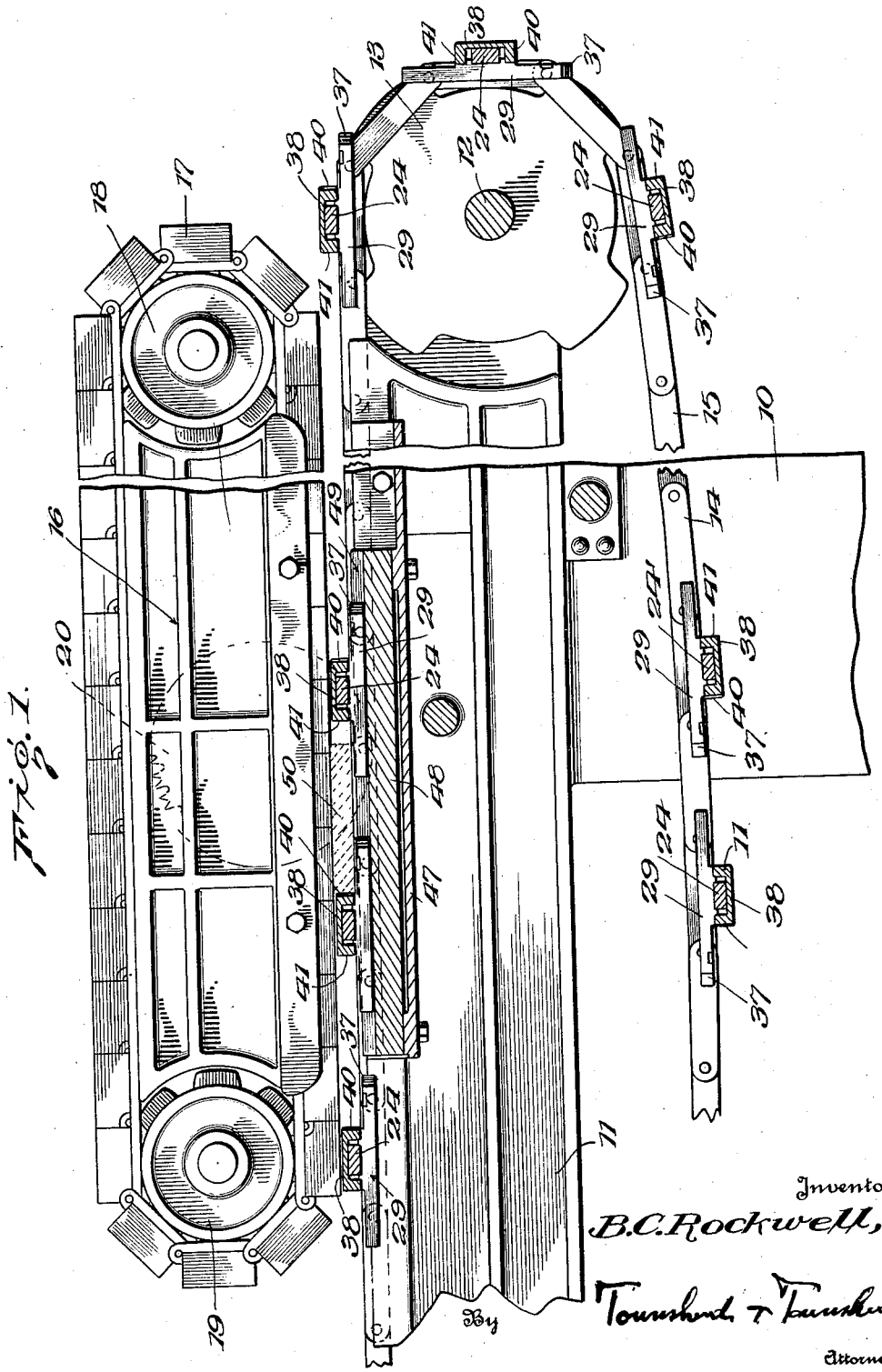
Inventor
B.C.Rockwell,
By Townshend + Townshend
Attorneys

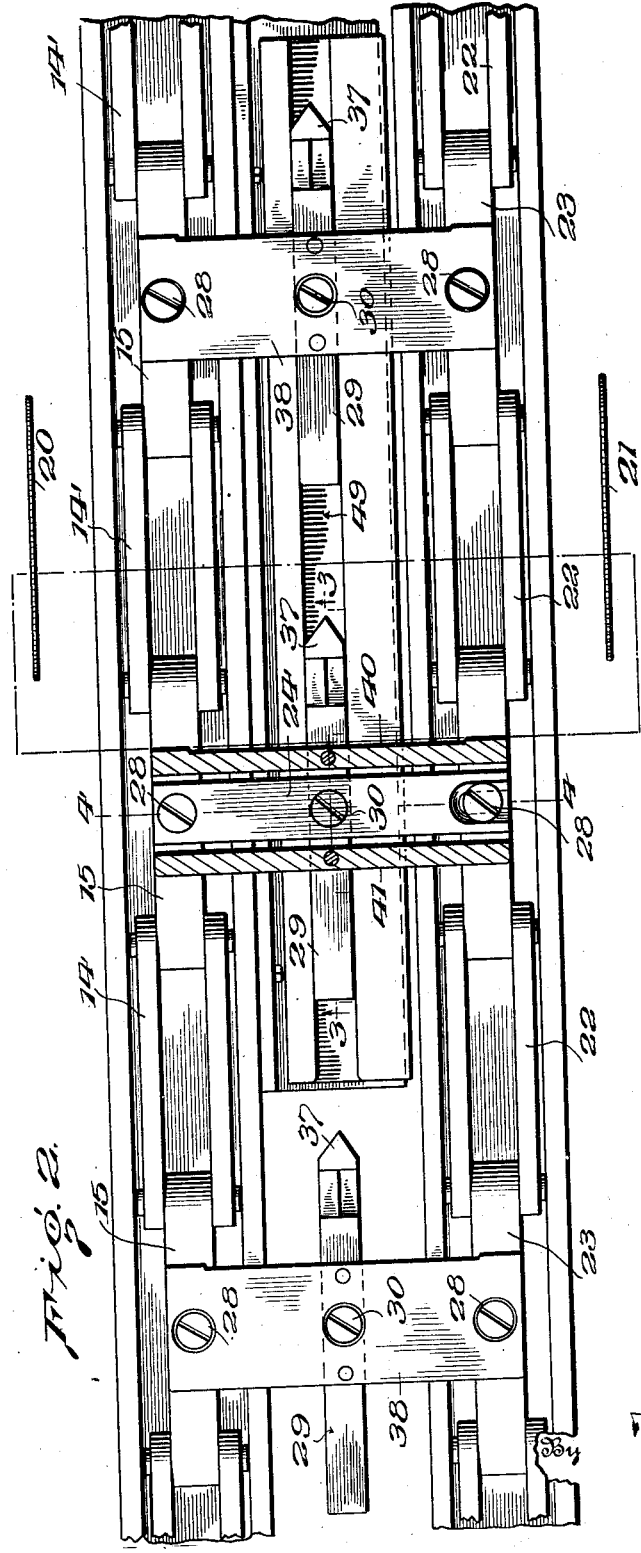
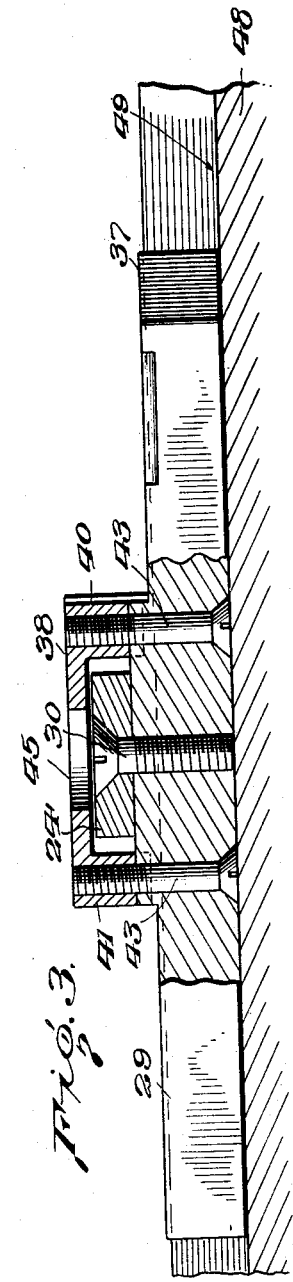

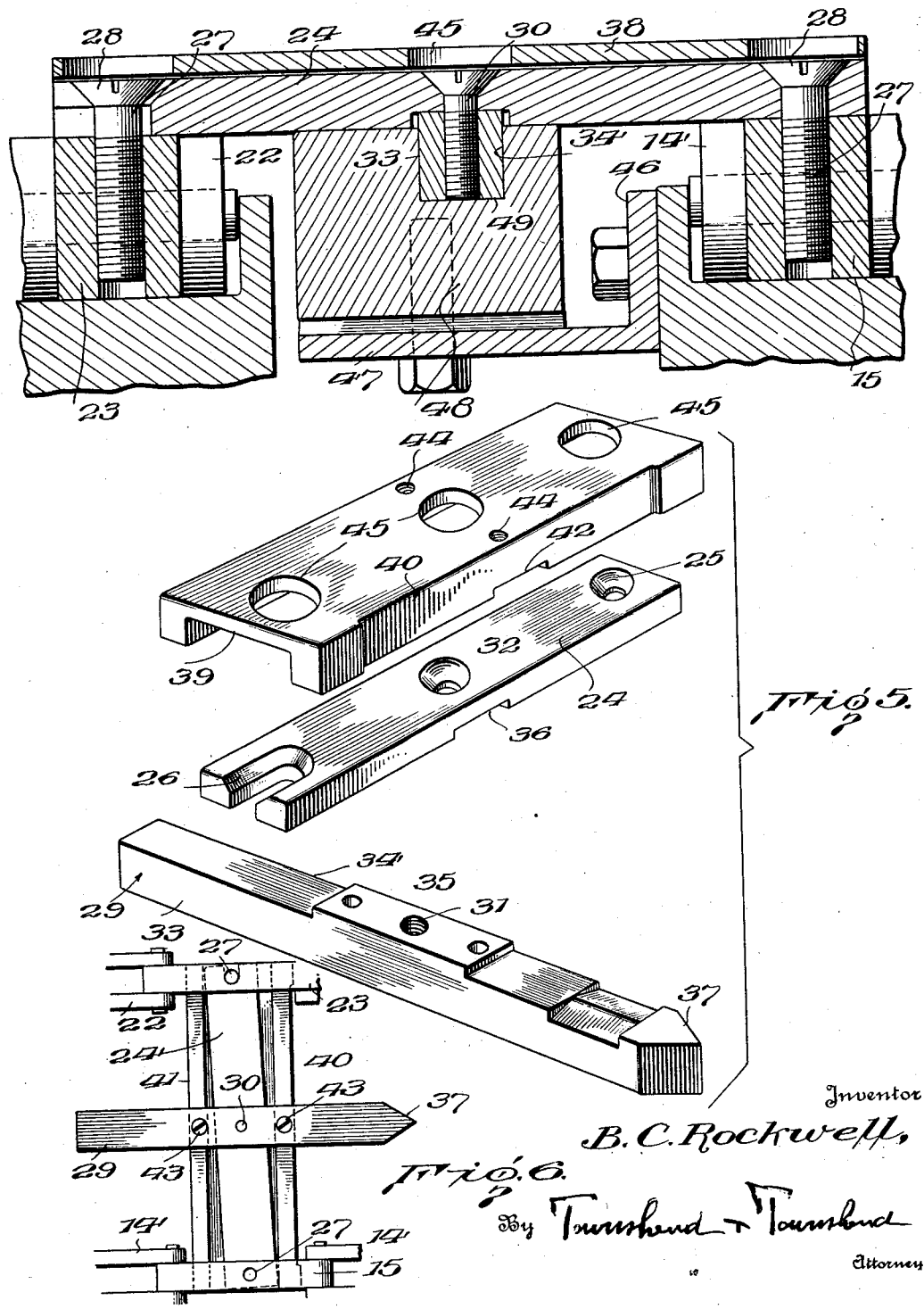

Patented Mar. 1, 1932

1,847,983

UNITED STATES PATENT OFFICE

BYRD C. ROCKWELL, OF SHEFFIELD, ALABAMA, ASSIGNOR OF ONE-HALF TO BRADLEY LUMBER COMPANY OF ARKANSAS, OF WARREN, ARKANSAS, A CORPORATION OF ARKANSAS

EQUALIZING ATTACHMENT

Application filed April 30, 1931. Serial No. 534,031.

This invention relates to wood cutting apparatus and in particular to equalizing machines of the general type wherein the work known as stock is carried through the mechanism on moving conveyors and brought into engagement with cutting mechanism for trimming off the ends of the stock.

In this class of apparatus it is desired to obtain proper square cutting of the stock such as floor boards, blocks, and the like, and it has heretofore been the practice to utilize abutments fixed on the work conveyors against which the work abuts to determine its position relative to the cutting mechanism with which the apparatus is associated. This practice has not proved satisfactory for the reason that the conveyors which are invariably arranged in parallel spaced relation, quite frequently travel at different relative speeds which will cause a shifting of the stock and result in an angled cut at the ends of the stock. While the angle cut is not considerable, it nevertheless is such as to necessitate a further trimming of the stock before it can be used as in the case of floor blocks and the like the stock must be absolutely square.

Objects of the present invention are: to provide an equalizing attachment for wood cutting machinery wherein a positive holding means is provided for the stock which insures an absolute square cut as the work is fed through the machine; to provide an equalizing attachment for wood cutting machinery whereby the work is guided into engagement with the cutter mechanism by means which prevents any possibility of shifting as the work is carried under the cutters; to provide a work positioning attachment arranged to be carried by conveyor chains of double equalizing wood saw machines and which attachment is provided with means for maintaining the same in a true predetermined position with respect to the line of cut irrespective of relative shifting between component elements of the conveyor chains; and generally to provide a novel improved guide attachment for insuring an absolute square cut at the opposite ends of stock passed through a double end cutting machine.

Other objects will be understood by those skilled in the art and it is to be understood that the disclosure of this specification and the drawings relates to a preferred, practical embodiment of the invention constituting the best means thus far devised for reducing the invention to practice. It is to be understood that the disclosed details are not intended as limitations inconsistent with the scope of the invention as claimed.

In the drawings:

Figure 1 is a central longitudinal section through the tail end portion of a conventional double end cut machine and directed toward the fixed side of the mechanism.

Figure 2 is substantially a top plan view of the endless conveyor mechanism with which the machine is equipped and illustrating in detail the particular mounting of the equalizing attachment of the present invention.

Figure 3 is a section substantially on the line 3—3 of Figure 2.

Figure 4 is a transverse section on the line 4—4 of Figure 2.

Figure 5 is a group perspective illustrating the component elements making up the equalizing guide attachment of the invention.

Figure 6 is a plan view of the attachment as mounted on the conveyor mechanism of the machine and illustrating diagrammatically the position of the guide in relation to shifting movement between component elements of the conveyor mechanism.

As shown in Figure 1, the machine proper comprises at its fixed side a base or standard 10 carrying a side bar 11 at one end of which, known as the tail end of the machine, is mounted the shaft 12 of a driven sprocket wheel 13 carrying thereon an endless conveyor of the link chain type made up of link sections 14 spaced apart by intermediate solid block sections 15. It will be understood that a sprocket wheel similar to the sprocket 13 is mounted in the opposite end of the machine, known as the feed end, which is not shown.

Supported on the side rail 11 and arranged slightly above the top plane of travel of a conveyor, is a traveling compressor bar mechanism generally indicated as at 16 and which carries presser blocks 17 made up in the form of an endless conveyor operating over driven end sprockets 18 and 19. The function of this pressure mechanism is well understood by those skilled in the art, its object being to cooperate with the work conveyor chains for maintaining the work, such as stock comprising floor blocks and the like, in proper position for passage beneath the rotary saw mechanism, one such saw being shown at 20 in Figure 1 and the location of which is well illustrated in Figure 2 wherein the saw 21 of the opposite side of the mechanism is shown. It is to be understood that the opposite or movable side of the machine is similarly equipped with work conveyor chain and sprocket mechanism and presser bar mechanism which presser mechanism is not shown herein.

As best shown in Figure 2, the endless conveyor mechanism upon which the work is carried through the machine consists of two parallel conveyor chains one of which is arranged at the fixed side of the machine and comprises the sections 14 and 15, while the other chain is located at the adjustable side of the machine and consists of link sections 22 spaced apart by intermediate solid block sections 23 corresponding to the sections 14 and 15 of the opposite side chain. In the operation of machinery of this type it has heretofore been the custom to dispose upright lugs upon each of the solid block sections of the respective conveyor chains to provide abutments against which one side edge of the block to be cut is positioned so that the block is carried through the machine extending transversely of the conveyor chains beneath the presser mechanism at opposite sides of the machine and accordingly beneath the saws 20 and 21 so that a square cut may be imparted at the edges of the blocks.

Due to the fact that for various reasons such as take-up adjustment, improper bearing and the like, it is quite often the case that the conveyor chains while traveling theoretically together and in the same direction will quite often vary in speed so that at times one chain will be traveling in advance of the other. When this occurs the work mounted on the conveyor will be shifted out of the perpendicular with respect to the longitudinal meridian of the conveyor and the ends of the work will engage the cutter members 20 and 21 at an angle resulting in an improper edge cut and a defective product.

In the present invention the conventional lugs hereinbefore referred to are eliminated and are replaced by transversely disposed metal straps 24 having apertures 25 and 26 at their opposite ends to which threaded fastening elements such as screw bolts 27 are disposed for attaching the respective ends of the straps to the conveyor chain block sections 14 and 23. The heads 28 of the screw bolts 27 bear in the countersunk apertures 25 and 26 and with respect to the attaching elements 27 the apertures 25 and 26 are slightly enlarged in order to provide a tolerance of movement between the straps 24 and the respective block sections of the conveyor chains. This tolerance of movement permits sufficient operation of the mechanism as, particularly as shown in Figure 6, one side chain may advance with respect to the other without placing an undue strain on the transversely disposed straps which will assume the angled position as indicated in Figure 6. The aperture 26 opens to the end of the strap in order to provide the necessary tolerance of movement with respect to the attachment in the conveyor chain blocks.

At its central portion each strap 24 is pivotally connected with a guide member 29, preferably by a screw bolt 30 having its shank threaded into a socket 31 formed in the guide and headed against the upper face of a countersunk aperture 32 provided in the strap 24. In assembling the strap and guide these elements are arranged so that the guide is disposed substantially at a right angle with respect to the strap.

The guide member 29 comprises an elongated bar which is square in cross section having oppositely disposed flat side faces 33 and 34. The upper faces of the bar intermediate its ends is provided with a raised section 35 having a flat upper face which engages against the under face of the strap 24 seating in a channeled recess 36 provided transversely across the under face of the strap as shown in Figure 5. The width of the channeled recess 36 is made larger than the width of the bar guide 29 so that the strap 24 may shift for a limited movement with respect to the guide 29, pivoting on the shank of the screw bolt 30.

At one end the guide 29 is formed with an entrant head 37 having angled side faces providing in effect an arrow head at the forward end of the guide bar with respect to its travel through the mechanism.

Cooperating with the strap 24 and the guide bar 29 there is employed a work holding element, conveniently termed a master lug, formed as a plate 38 having a length coincident with that of the strap 24 over which the plate is adapted to be mounted. In order to accommodate this mounting of the work engaging member 38 over the strap 24, the under face of plate 38 is channeled as at 39 to receive the body of the strap 24 and the width of the channel is made greater than the width of the strap 24 in order to permit a tolerance between the parts whereby the strap 24 may have a limited shifting movement beneath the plate 38, pivoting on the shaft of the bolt 30. The side edges 40 and 41 of the plate 38 extend downwardly to approximately the plane of the upper face of the guide bar 29, the sides 40 and 41 being provided with transversely aligned channeled recesses 42 corresponding to the channeled recess 36 and strap 24 to engage over the raised portion 35 on the guide bar.

In the case of the recesses 42 their dimensions are such that no clearance is provided between the recess walls and the raised portion 35 of the guide bar so that when the stock holding plate 38 is engaged over the strap 24 and the guide bar there is no permissible shifting movement between the plate 38 and the guide bar. The plate is further anchored to the guide bar by means of securing bolts 43 passed through the body of the guide bar and the sides of plate 38 in the threaded apertures 44. In order to provide for ready accessibility to the bolt heads 28 and the head of the bolt 30 by which the strap 24 is attached respectively to the guide bar 29 and the conveyor chains, the plate 38 is provided with apertures 45 which register with the aforesaid bolt heads and permit access thereto.

In assembling the attachment for operation, the strap 24 is positioned over the raised portion 35 of the guide bar 29 and secured thereto by the pivot bolt 30, whereupon the plate 38 is positioned in a like manner and secured by the attachment bolts 43. The unit thus formed is then attached to transversely aligned solid block links in the conveyor chains, as best indicated in Figure 2. The attaching bolts 27 are engaged in the solid block link sections of the respective side chains so that the master lug or holding plate 38 and strap 24 will be disposed transversely between the conveyor chains with the guide bar 29 depending from the unit at a point between the conveyor chains.

Rigidly secured to the fixed side rail 11 of the machine is a bracket 46 having a lateral flange 47 upon which is mounted a guide rail member 48. This guide rail member is preferably in the form of a solid block having a length approximately coinciding with the length of operative engagement of the presser bar mechanism previously described. The upper face of the guide rail block 48 is formed with a squared channel 49 forming a guideway through which the guide bar 29 is adapted to move as the conveyor is operated. The depth and width of the guideway 49 is such that there is no permissible variation or play permitted the guide bar 29 which engages the guideway along its bottom and opposite side faces 33 and 34. By this construction it will readily be apparent that with the guide bar engaged in the guideway 49 there can be no possible shifting of the work engaging member 38 with respect to the guide rail although there is a permissible movement accorded the strap 24.

The guide rail 48 and guideway 49 are so mounted in the machine that the guideway provides a path of travel for the guide bar 29 which is in fixed true parallel relationship to the line of cut of the saws 20 and 21. The forward face of the work engaging member 38 comprising its side 40 is formed for flat bearing engagement against one straight edge of a piece of stock indicated as at 50 in Figure 1. It is apparent that with the stock positioned with one side edge bearing against the member 38, the section of stock will be positioned transversely of the conveyor so that its opposite ends project from the conveyor beneath the presser mechanism and are moved into engagement with the saws 20 and 21 during the operation of the machine. The fixed relationship of the stock engaging member 38 and the guide bar 29 together with the fixed relationship imparted to this unit by movement of the guide bar 29 through the guideway 49 provides a positive means which prohibits any possibility of shifting of the stock upon the conveyor.

In the operation of the machine a desired number of attachments described are secured between the conveyor chains, and at the feed end of the machine the various sections of stock, generally consisting of floor blocks, are positioned in engagement with the forward sides of the stock holding members 38. As the conveyor chains travel onward into the machine the entrant heads 37 on the respective guide bars 29 will successively enter and engage the guide bars within the guideway 49. As the conveyor then travels along it is immaterial whether or not one side chain advances at a rate faster than the other, for on such an occurrence the strap 24 merely rocks on its pivot to compensate for the difference in speed. Even though the strap 24 rocks on its pivot there can be no possible shifting of the stock for the reason that the guide bar 29 cannot move in any direction other than in a plane which is in true parallel to the line of cut at the saws 20 and 21. This arrangement of parts therefore insures an absolute square cut at the opposite ends of the stock, something which has not heretofore been possible due to the fact of the relative shifting between the chains of the conveyor.

It is obvious that this guide arrangement may be employed upon a single chain conveyor if desired or the guide may be employed with belt conveyors merely by providing for the requisite clamping of the parts against the opposite sides of the belt. As the machines with which the attachment of this invention are designed to be used are capable of adjustment to accommodate different lengths of stock, such as by shifting the movement side of the machine laterally to and from the fixed side, the difference in adjustment is accommodated by the use of straps and stock engaging members of different lengths. A further adjustment may also be obtained through an adjustment of the position occupied by the guide rail block 48 with respect to the fixed side of the machine.

I claim:

1. An equalizing attachment for wood sawing machines comprising a guide bar, a supporting member movably attached thereto, a stock engaging member disposed over said supporting member and having a rigid connection to said guide bar, and means for attaching said supporting member to the stock conveyor mechanism of a wood sawing machine.

2. In a wood cutting machine having parallel spaced cutters and a conveyor movable therebetween for carrying stock into engagement with said cutters, a stock engaging abutment, a guide member rigidly secured to said abutment, and conveyor attachable means having a loose engagement with said abutment and guide member.

3. In a wood cutting machine having a cutter and a traveling conveyor for moving stock into engagement therewith, a guide rail secured to said machine in fixed parallel relation to the line of cut of said cutter, stock engaging means, supporting means adapted for attachment to said conveyor transversely thereof and having a loose engagement with said stock engaging means, and a guide secured to said stock engaging means for cooperative engagement with said guide rail.

4. In a wood cutting machine having parallel spaced cutters and a stock conveyor movable therebetween and comprising spaced endless chains, stock holding members disposed on said chains and extending transversely thereof, guide means carried by said stock holding members for maintaining said holding members in a predetermined relation with respect to the line of cut of said cutters, and means for supporting said holding members and guides between the chains of said conveyor, said supporting means having loose connection with said chains, guides, and stock engaging members.

5. A stock guiding attachment for wood cutting machines having a movable conveyor, comprising a guide rail mounted in fixed relation on a machine, a movable guide adapted for sliding engagement with said rail member, a supporting member having pivotal connection with said guide and adapted for loose connection to the conveyor, and stock engaging means having fixed connection with said guide in a manner to permit movement of said supporting member with respect thereto.

6. In a wood cutting machine, a cutter, a conveyor for moving stock past said cutter and comprising spaced parallel chains, a cross bar disposed between said chains and having loose connection therewith at each end of the bar, a guide pivotally connected to said bar intermediate its ends, means on said machine for engaging said guide to maintain the same in parallel relationship to said cutter, and a stock engaging element disposed transversely of said chains and having fixed connection with said guide on opposite sides of said bar.

In testimony whereof I affix my signature.

BYRD C. ROCKWELL.